(12) United States Patent
Meyer et al.

(10) Patent No.: US 8,171,493 B2
(45) Date of Patent: May 1, 2012

(54) VXML BROWSER CONTROL CHANNEL

(75) Inventors: Mark Meyer, Erie, CO (US); Brian Marquette, Longmont, CO (US); Bret Butcher, Morgan Hill, CA (US); Christopher Kramp, Boulder, CO (US); Charles Corfield, Boulder, CO (US); Michael Clark, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 986 days.

(21) Appl. No.: 11/469,789

(22) Filed: Sep. 1, 2006

(65) Prior Publication Data

US 2007/0150902 A1    Jun. 28, 2007

Related U.S. Application Data

(60) Provisional application No. 60/714,452, filed on Sep. 6, 2005.

(51) Int. Cl.
G06F 3/00 (2006.01)
G06F 9/44 (2006.01)
G06F 9/46 (2006.01)
G06F 13/00 (2006.01)

(52) U.S. Cl. ........................................................ 719/313
(58) Field of Classification Search ................... 719/313
See application file for complete search history.

(56) References Cited

U.S. PATENT DOCUMENTS

| 2003/0071833 A1* | 4/2003 | Dantzig et al. ................ 345/700 |
| 2003/0152202 A1* | 8/2003 | Mumick et al. ............ 379/93.17 |
| 2003/0182622 A1 | 9/2003 | Sibal et al. |
| 2004/0120473 A1 | 6/2004 | Birch et al. |
| 2005/0286707 A1* | 12/2005 | Erhart et al. ............. 379/265.07 |

FOREIGN PATENT DOCUMENTS

| EP | 1 193 961 | 4/2002 |
| EP | 1 610 536 | 12/2005 |

OTHER PUBLICATIONS

EPO Communication for Application No. 06802890.1-1237 dated Sep. 14, 2009.

* cited by examiner

*Primary Examiner* — Andy Ho
*Assistant Examiner* — Timothy A Mudrick
(74) *Attorney, Agent, or Firm* — Holland & Hart LLP

(57) ABSTRACT

A system to allow external applications to interact with an operating VXML browser include a VXML browser operating on a processor having a VXML interpreter. A control is operably interconnected between the external application and the VXML interpreter using a communication channel. The control inserts the commands into the VXML interpreter, which are processed by the VXML browser in a conventional manner to allow the external application to interact with the operating VXML browser.

11 Claims, 10 Drawing Sheets

VXML BROWSER CONTROL CHANNEL

RELATED APPLICATIONS

The present application claims priority to U.S. Provisional Patent Application Ser. No. 60/714,452, filed Sep. 6, 2005, titled VXML BROWSER CONTROL CHANNEL, incorporated herein by reference.

FIELD OF THE INVENTION

The present invention relates to voice extensible markup language ("VXML") browsers and, more particularly, to a control channel between a VXML browser and independent applications to allow the VXML browser and independent applications to communicate.

BACKGROUND OF THE INVENTION

VXML browsers provide an execution environment for VXML scripts, which describe the user-interfaces of applications driven by, for example, touch-tone digit recognition or speech recognition. For Example, VXML browsers and associated scripts may provide the interface for interactive voice response ("IVR") systems, which typically use touch-tone digit recognition. VXML browsers and scripts also may be used to provide application interfaces for push-to-talk systems, such as, for example, two-way radios, which lack numeric keypads and, therefore, must use speech recognition.

Several commercially available products today have some capability to communicate with VXML browsers. For example, interactive source level debuggers exist. Debuggers provide a mechanism to view and control the execution of the source code, and inspect the values of code variables. Multi-modal products also exist. For example, the VOX Gateway™, from Motorola, Inc., permits control over a VXML browser, where VXML fragments are embedded in a J2ME ("J+V") application running on a Motorola cell phone; the VXML fragments are sent to a VXML browser for execution, so that the user's voice input can be recognized. Similarly, IBM has demonstrated an "X+V" system that executes VXML scripts embedded in a hypertext markup language ("XHTML") environment. This configuration runs in the Opera™ web browser. Other products that function with the VXML browser are voice-application test harnesses. These test harnesses place calls to IVR systems, which support VXML, to perform rudimentary verification of system availability, responsiveness, and correctness. However, the test harnesses fail to inspect the internal state of the system to determine whether the browser's internal states are correct.

Against this background, it would be desirous to develop a communication or control channel that allows for the above and other functionality to be implemented in a VXML browser.

SUMMARY OF THE INVENTION

The present invention provides a system to allow external applications to interact with operating VXML browsers. The system comprises a VXML browser operably connected to a VXML Interpreter. A control is operably connected to the VXML Interpreter and to at least one external application. The at least one external application transmits commands to the control over a communication channel that the control inserts into the VXML Interpreter such that the external application interacts with the VXML browser during VXML browser operation.

The present invention also provides a method for interacting with a VXML browser operating on a processor. The method comprising connecting an application external to the VXML browser to a control and providing interactive commands to the control. The control inserts those commands to a VXML Interpreter and the VXML browser executes the commands in the VXML Interpreter in a conventional manner.

The foregoing and other features, utilities and advantages of the invention will be apparent from the following more particular description of a preferred embodiment of the invention as illustrated in the accompanying drawings.

BRIEF DESCRIPTION OF THE DRAWING

The features, objects, and advantages of the present invention will become more apparent from the detailed description set forth below when taken in conjunction with the drawings in which like reference characters identify correspondingly throughout and wherein.

DETAILED DESCRIPTION

VXML Browser Plus the Control Channel

Figure 1A:
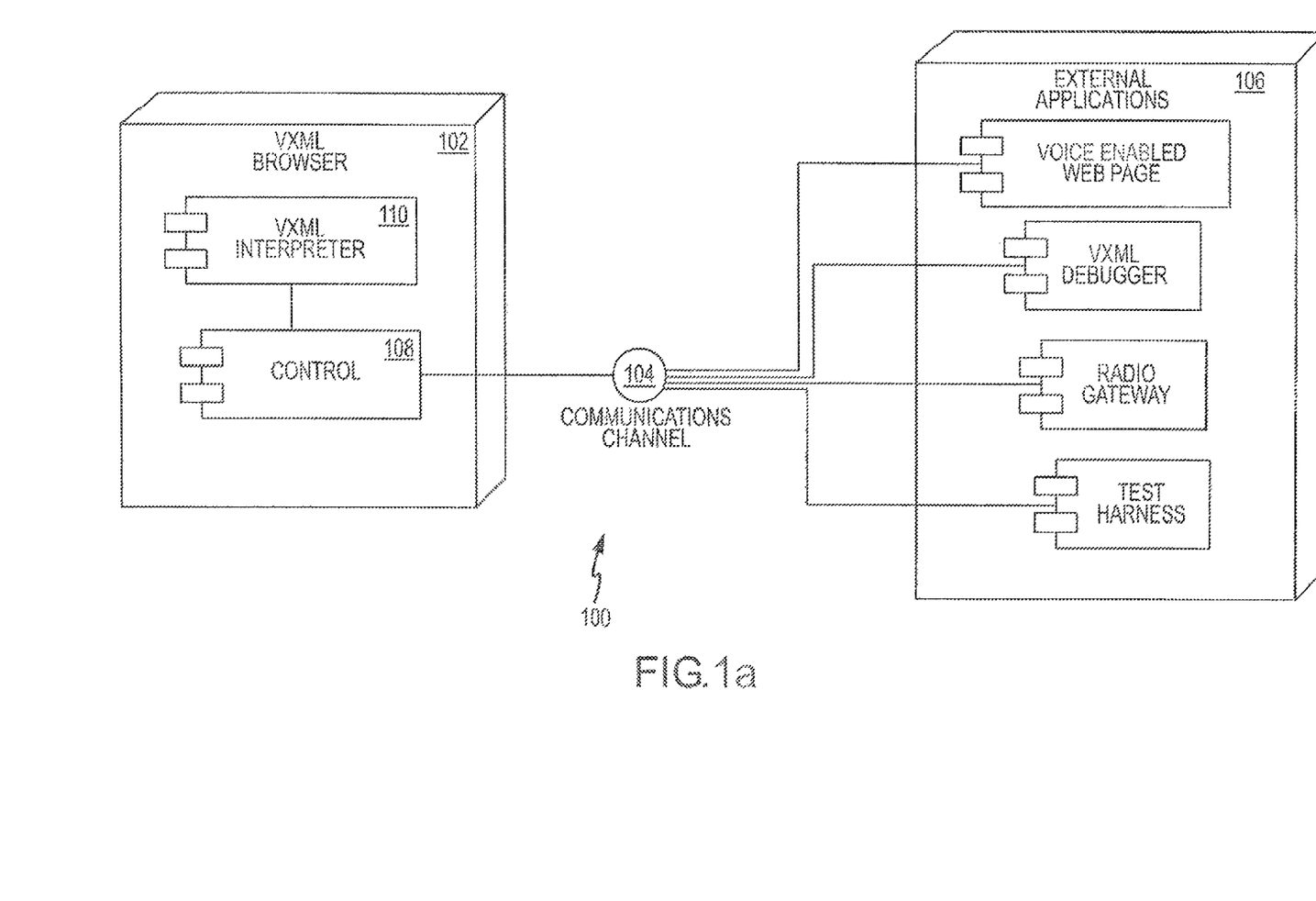
FIG. 1a is a functional block diagram of an exemplary embodiment of a system incorporating the technology of the present application.

Referring now to FIG. 1a, an exemplary system 100 is provided. The word "exemplary" is used herein to mean "serving as an example, instance, or illustration." Any embodiment described herein as "exemplary" is not necessarily to be construed as preferred or advantageous over other embodiments. Moreover, the embodiments described herein should be considered exemplary unless stated otherwise. System 100 includes a VXML browser 102, a communication channel 104 (also known as a control channel or event channel), and external applications 106 (sometimes referred to as client or the like). As is generally understood in the art, VXML browser would be operating on a processor, such as, for example, a processor contained in any of a desktop computer, a laptop computer, a handheld computer, a server, an digital music player, an electronic game, a handheld cellular telephone, a VoIP activated device, or the like. External application 106 may be contained locally on the same processor or remotely on one or more other processors as a matter of design choice. Communication channel 104 comprises an possible data link.

Examples of external applications 106 include: voice-enabled web pages, interactive source code debuggers for VXML, network gateways for 2-way radios, automated application test harnesses, and the like. The channel provides a way for the VXML browser to notify an external program of interesting "events" during the execution of a VXML script, or to provide details of its internal state, or to afford an external program a way to control the execution of the VXML browser. The communication channel 104 would provide a means for handling synchronous and asynchronous events/communications, a means to select channel type for the underlying communication protocols (such as, for example, UDP, TCP, or the like), a means to maintain the state of the channel, such as connection status and message exchange progress, a means to select the type of information to be communicated or accomplished through a message filter, and a presentation format for communicated information. VXML browser 102 would also include a control 108 connected to a VXML Interpreter 110. Control 108 could be integrated into VXML browser 102 or a separately operating module or routine associated with the processor. External programs 106, such as a debugger, radio gateway, multi-modal application, test harness, and the like, would use communication channel 104 to access control 108 to control the execution of certain aspects of the VXML browser 102. Controlling the execution of the VXML browser 102 involves operations, such as, start, stop, resume, set break point, etc. For example, if an external application issued a command for the VXML browser 102 to pause, the command would be transmitted from external applications 106 over communication channel 104 to control 108. Control 108 may map the transmission from the external application into a format suitable for VXML browser execution (and vica versa and insert the command into the VXML Interpreter 110. The VXML Interpreter 110 would process the inserted command in a manner consistent with a conventional VXML browser 102 and pause execution of the VXML Script. Control 108 also would have a means to inspect and modify the browser's internal state, while the execution of a VXML script has been suspended. This means to inspect and modify states would be used by external programs 106. The states are generally known in the art but include, for example, values for script variables, locations, and actions within the script being executed. Control 108 also may provide execution notifications.

Figure 1B:
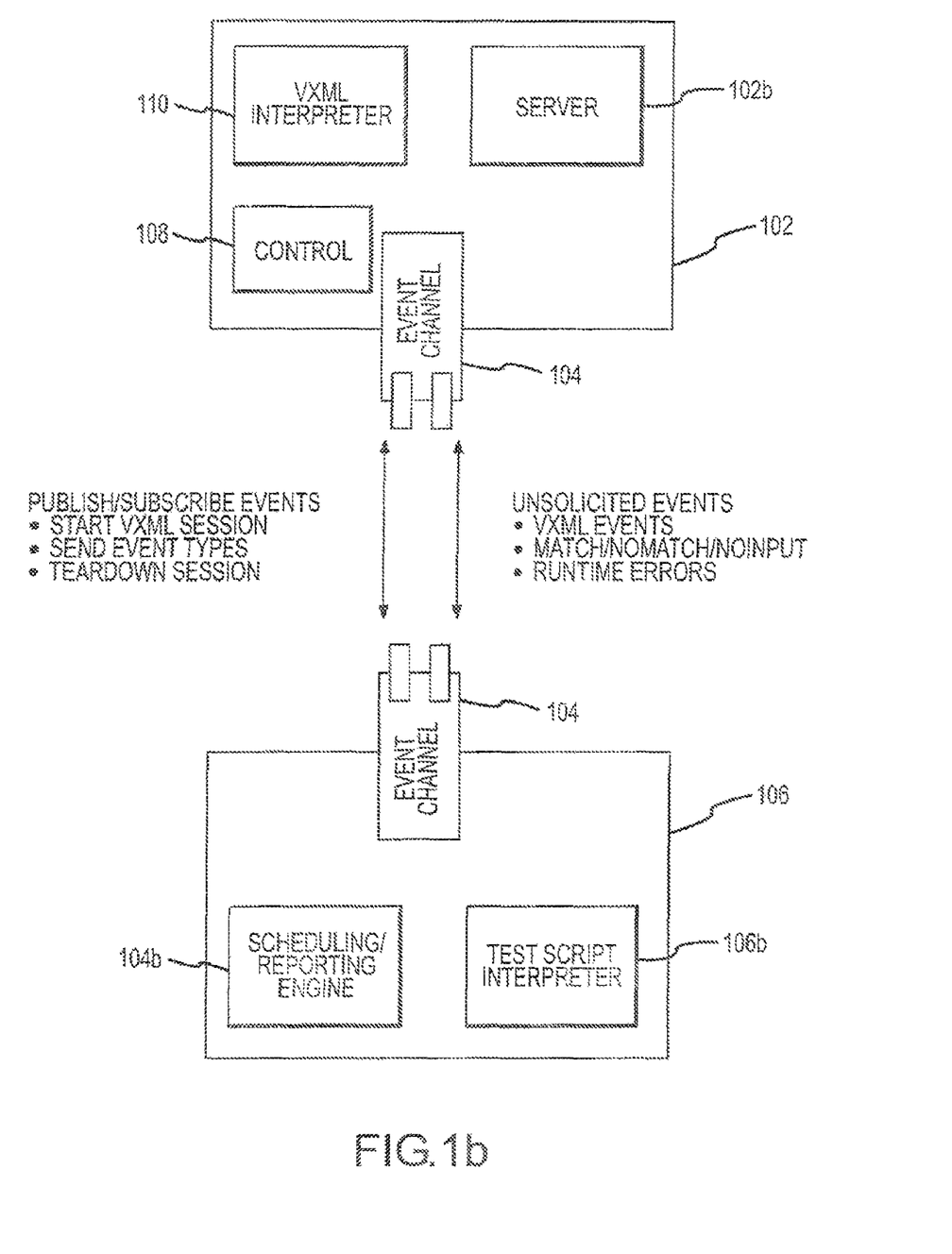
FIG. 1b is a functional block diagram of an exemplary embodiment of a system incorporating the technology of the present application.
Figure 1C:
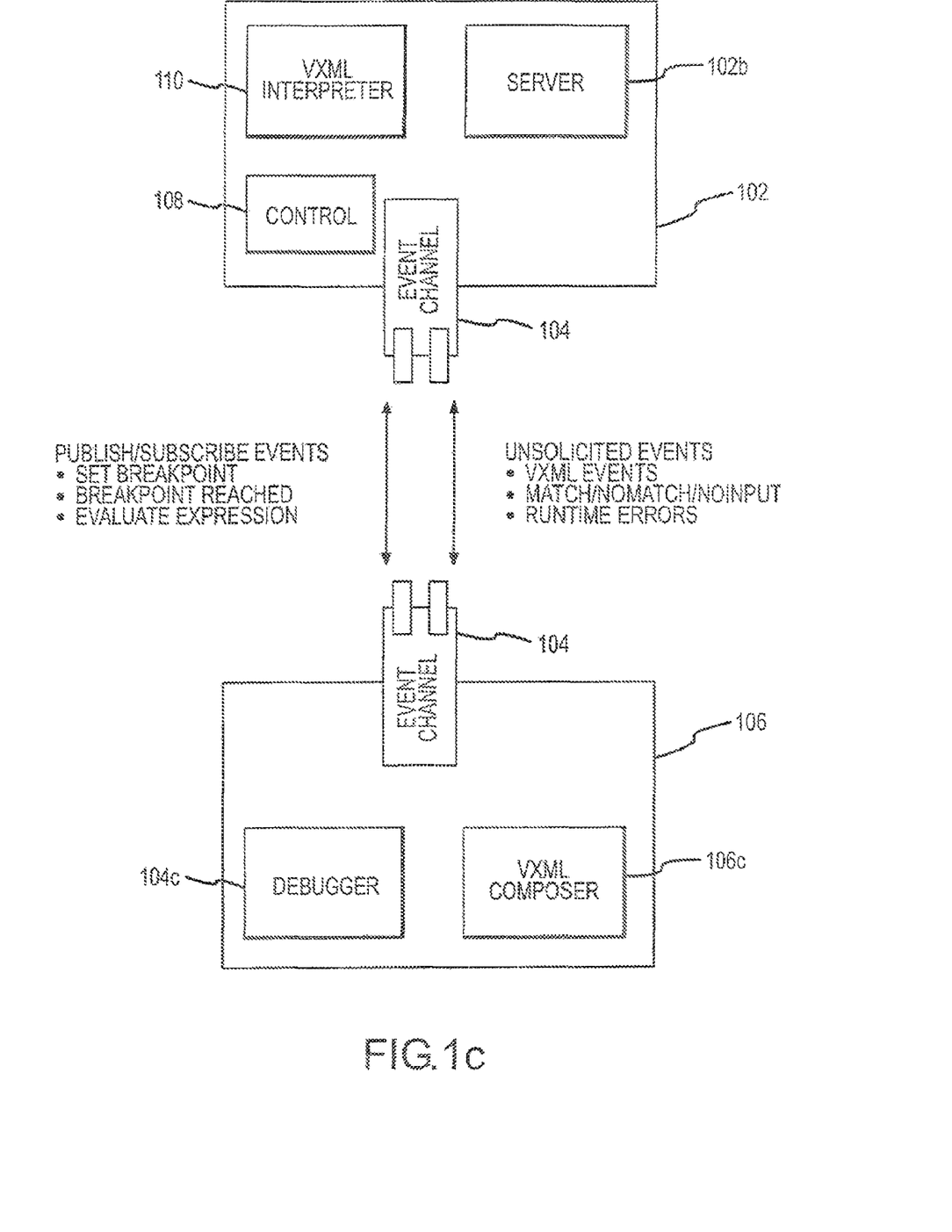
FIG. 1c is a functional block diagram of an exemplary embodiment of a system incorporating the technology of the present application.

Referring to FIGS. 1b and 1c, particular and exemplary client applications are described in more detail. FIG. 1b is exemplary of a test application 106. FIG. 1b shows a VXML browser 102 with a media server 102b, VXML Interpreter 110, and control 108 operatively connected to communications channel 104. Communications channel 104 also is operatively connected to external application 106, which in this case is a test harness. External application 106 includes scheduling/reporting engine 104b and a test script interpreter 106b. Scheduling/reporting engine 104b contains information regarding what type of test should be run by the test harness, when the test should be run, and how the results are provided. Test Script Interpreter 106b drives the platform to run the tests, which may be a load test, a 1-to-1 test or the like. FIG. 1c shows a VXML browser 102 with a media server 102b, VXML Interpreter 110, and control 108 operatively connected to communications channel 104. Channel 104 also is operatively connected to external application 106 that includes a debugger 104c and a VXML composer 106c. Composer 106c and debugger 104 operate to allow creation of applications to run on VXML browser 102.

Figure 6:
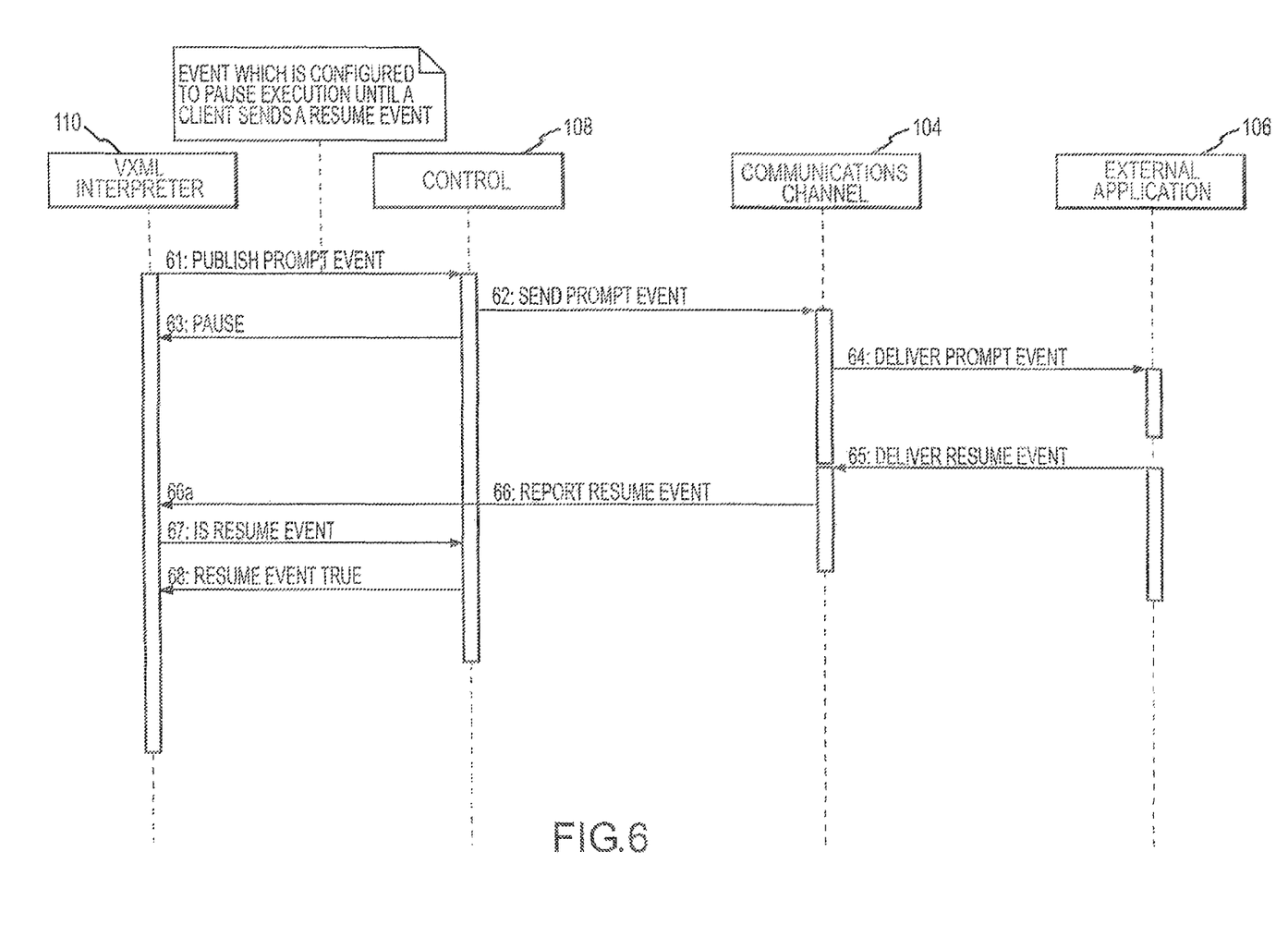
FIG. 6 is a sequencing diagram illustrating an exemplary external command of the system of FIG. 1 using technology of the present application.

The VXML browser 102 produces and consumes packets of data, representing events, commands, and internal status. Packets coming into the browser are queued to a VXML Interpreter 110 for processing in a conventional manner. The W3C standard relating to VXML describes a Form Interpretation Algorithm ("FIA") which controls when call-related events can be handled, such as the caller hanging up. However, the W3C FIA does not envisage the arrival of external commands to interrupt and control the execution of the VXML browser 102. Thus, the VXML browser 102 uses a modified W3C FIA to handle commands or events arriving over control channel 104. This allows the VXML browser 102 to halt its execution while processing a VXML script, yet leave the VXML application in a known state, as specified in the W3C standard, so that execution may be subsequently continued when a "resume" command arrives over channel 104. Sequencing diagram shown in FIG. 6 shows a potential sequencing for a pause/resume event using technology associated with the present application. First, VXLM browser is processing commands and information in a conventional manner using VXML Interpreter 110. During execution, an event that is configured to pause execution is identified, step 61. The event can be set by a client, an external application, predetermined, or the like. Control 108 detects the event and sends the event to communication channel 104, step 62. Before, after, or substantially simultaneously with, control 108 inserts a pause command in VXML Interpreter 110, which pauses VXLM browser, step 63. Communication channel 104 transmits the event to client application 106, step 64. When client application 106 processes or is otherwise ready to allow VMXL browser to resume operation, it delivers a resume command to communication channel 104, step 65. Communication channel 104 transmits the resume command to control 108, step 66. After, or substantially simultaneously with, receipt of the resume command, control 108 inserts the command to the VXML Interpreter 110, step 66a, which causes VXML browser to resume operation. VXML Interpreter 110 optionally, may signal a confirmation of the resume command, step 67, which is confirmed by control 108, step 68. Control 108 may convert information from VXML formats to appropriate formats for transmission to external applications 106 over communication channel 104, which may include mapping information to a client API compatible format.

Figure 7:
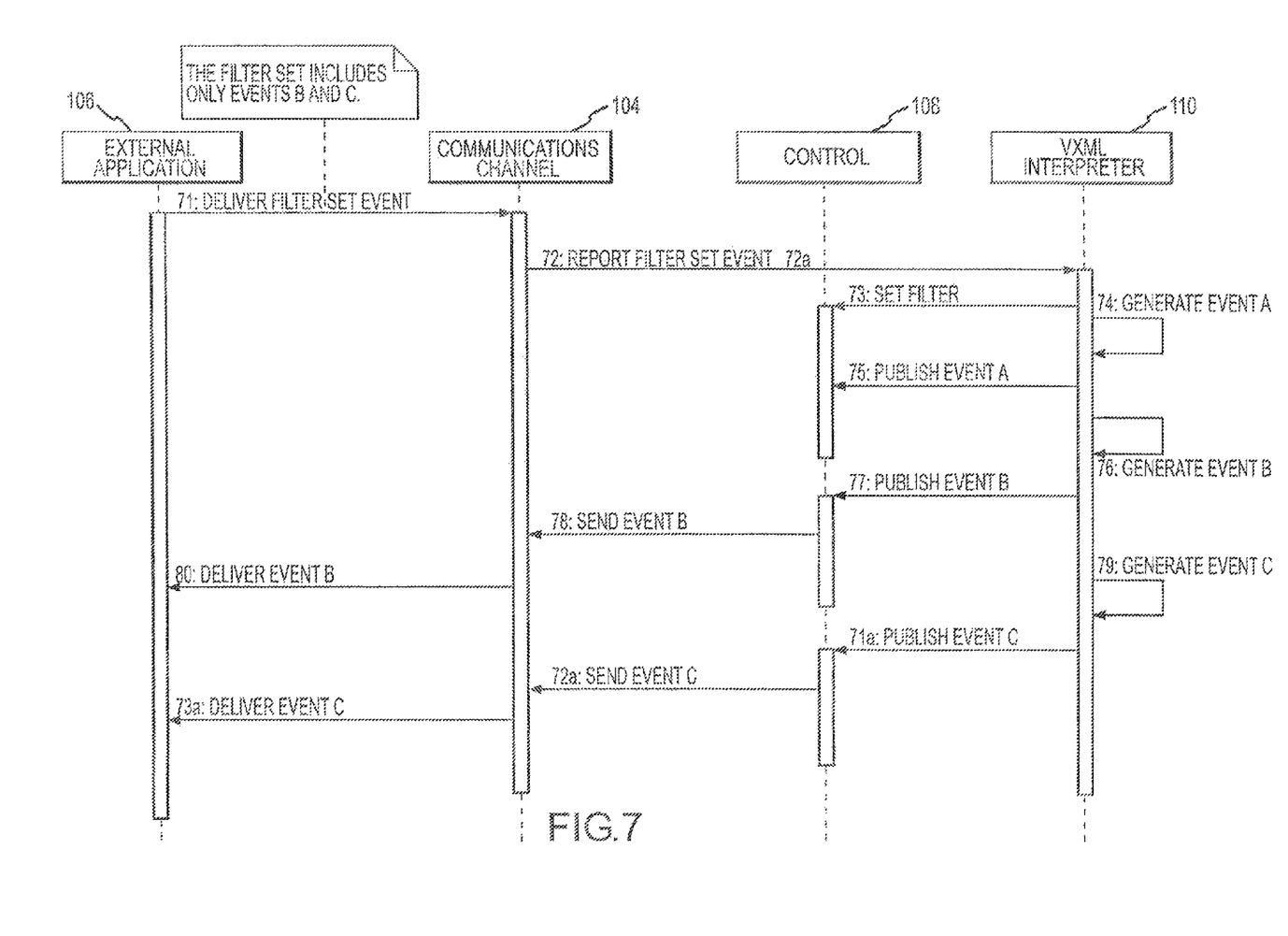
FIG. 7 is a sequencing diagram illustrating an exemplary external command of the system of FIG. 1 using technology of the present application.

Similarly, interesting events, which occur during execution of a script by the VXML browser 102, are checked against a user-specified filter to see if they should be sent over the control channel 104 to the external application 106 requesting such notification. The filtering to provide external application 106 such notifications is specific to the system 100 described and not generally available functionality. Examples of these events include: recognition started, prompt played, breakpoint reached, etc. Referring now to FIG. 7, a sequencing diagram detailing a filtering sequence using technology of the present application is provided. Initially, client application 106 delivers filter criteria to communication channel 104, step 71. Communication channel 104 delivers the events to control 108, step 72. Control 108 inserts the filters to VXML interpreter 110, step 72a, which optionally sends a confirmation to control 108, step 73. As shown in this example, events consist of event A, event B, and event C. External application 106 set the filters to detect event B and event C. During operation of VXML browser, event A is generated, step 74, and published to control 108, step 75. However, as no filter is set to detect event A, no further transmission is required. Over time, operation of VXML browser generates event B, step 76, and Event B is published to control 108, step 77. As Event B is a filtered event, control 108 delivers event B to communication channel 104, step 78, which transmits Event B (and/or its occurrence) to external application 106, step 80. Also, sometime during operation, VXML browser generates event C, step 79, and Event C is published to control 108, step 71a. As Event C is a filtered event, control 108 delivers event C to communication channel 104, step 72a, which transmits Event C (and/or its occurrence) to external application 106, step 73a. Notice, while events A, B, and C, are shown in a particular sequence, filtered events may occur in any sequence and the shown sequence is simply for convenience.

The VXML browser 102 allows multiple simultaneous control channel 104 connections. The control channel can be designed to support multiple styles of connections. For example, control channel 104 may be tied to a specific session initiation protocol ("SIP") session. Alternatively, sessions may just use control channel 104 without a SIP session. When tied to a SIP call, the VXML browser 102 receives the incoming call and creates a new control channel session for that call. The specifics of this new session are returned in the SIP response to the caller. The calling program extracts out the control channel 104 information (e.g. host, port, protocol) and connects back to the VXML browser 102.

The other connection style requires that the VXML browser 102 create a common control channel 104 on a well-known port. An external application 106 can use the control channel 104 client to connect to the VXML browser 102 on this port. Once the VXML browser 102 receives the connection request, the VXML browser 102 creates a new control channel port and a new VXML browser session. The new control channel port is returned to the calling program, which uses it for all subsequent interaction. Note that the well-known port remains available for other programs to request connections.

The control channel 104 uses socket connections (such as, for example, user datagram protocol ("UDP") and transmission control protocol ("TCP")), which means that the caller program can be on the same computer as the VXML browser 102 or on a different computer on the network. The network can be the Internet, a LAN, a WAN, a WiFi, Ethernet, fiber network, wireless network, or the like.

Figure 3:
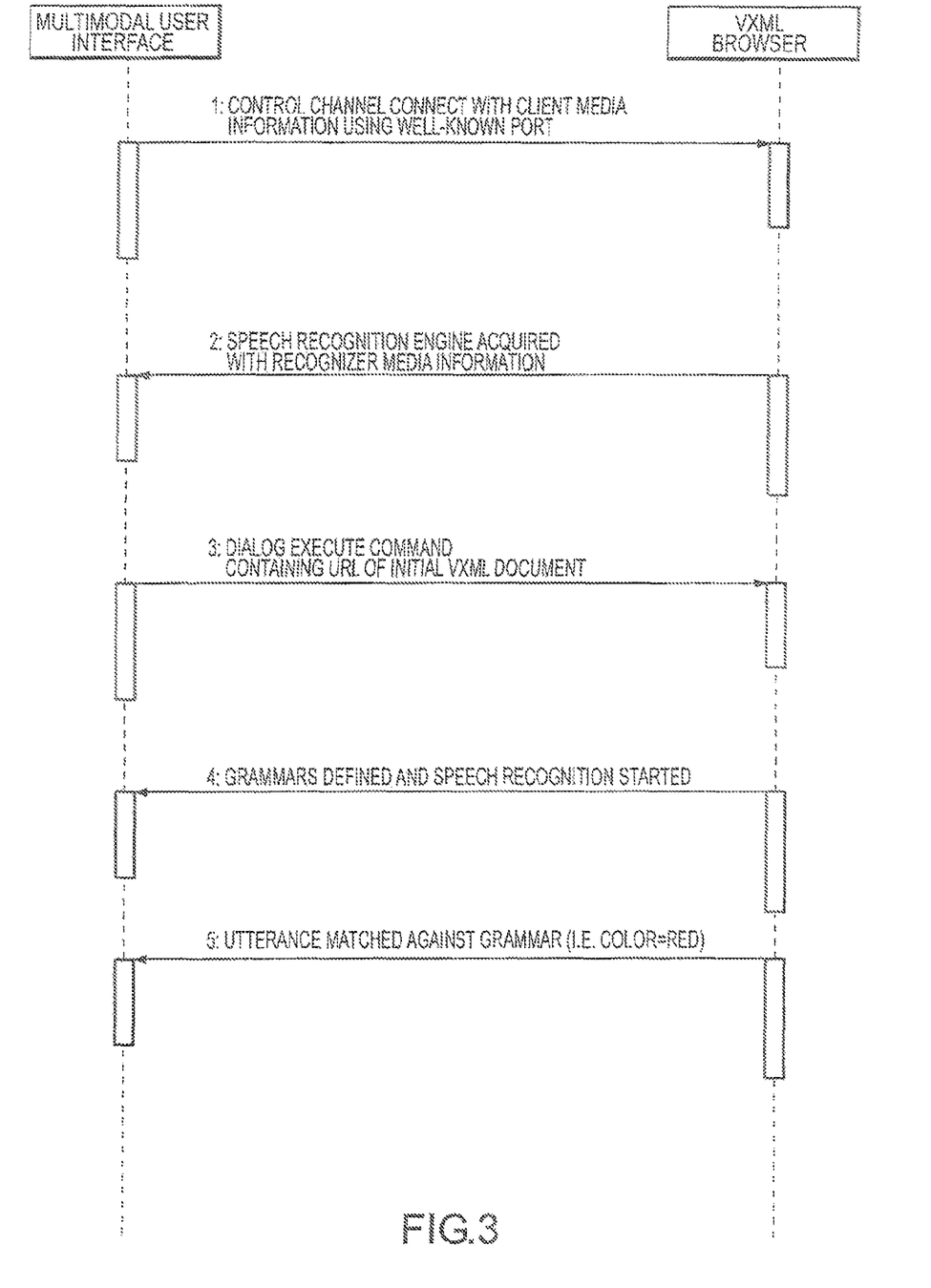
FIG. 3 is a sequencing diagram illustrating an exemplary sequence for a multi-modal user interface incorporating technology of the present application.
Figure 4:
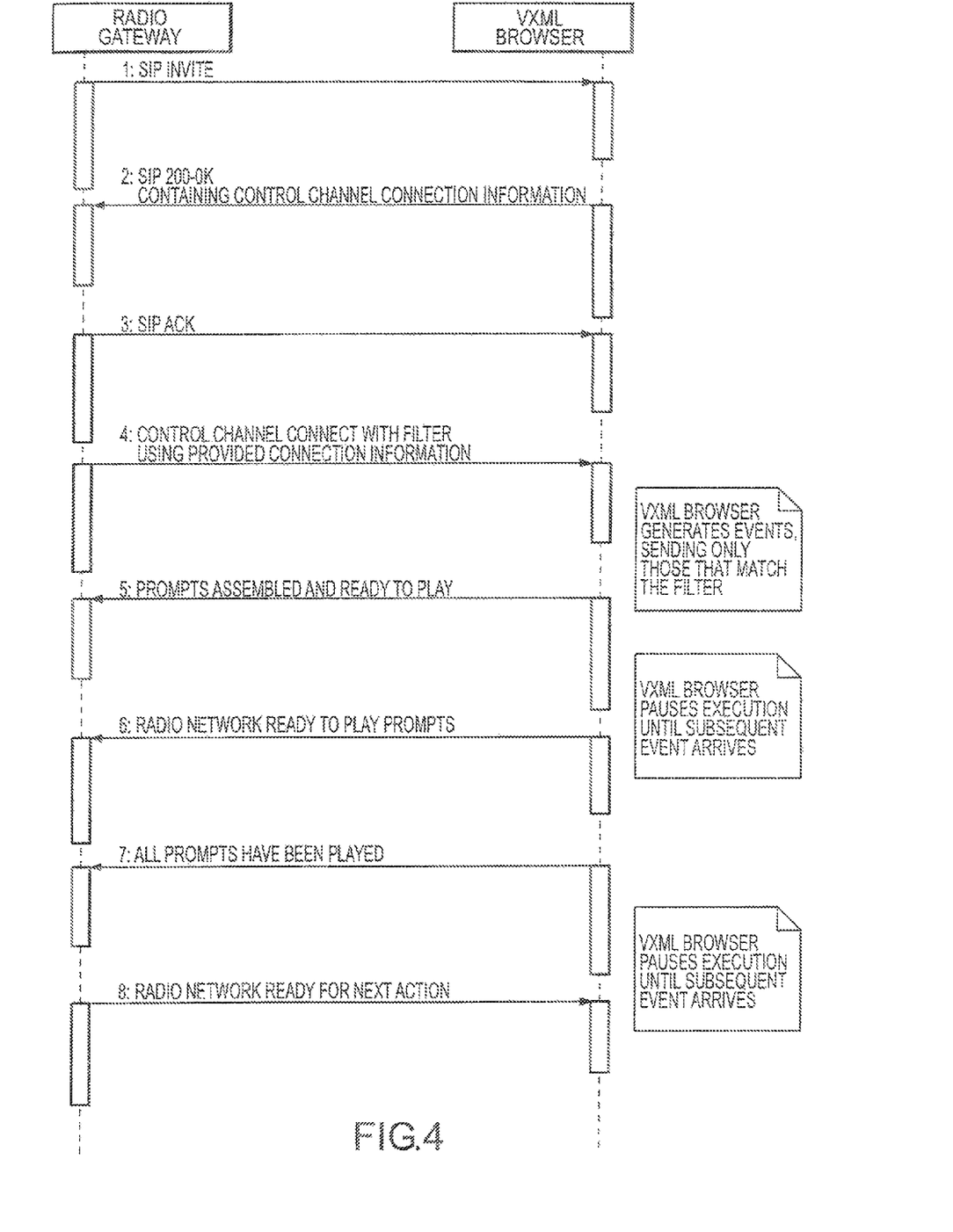
FIG. 4 is a sequencing diagram illustrating an exemplary sequence for a radio gateway or push-to-talk system incorporating technology of the present application.
Figure 5:
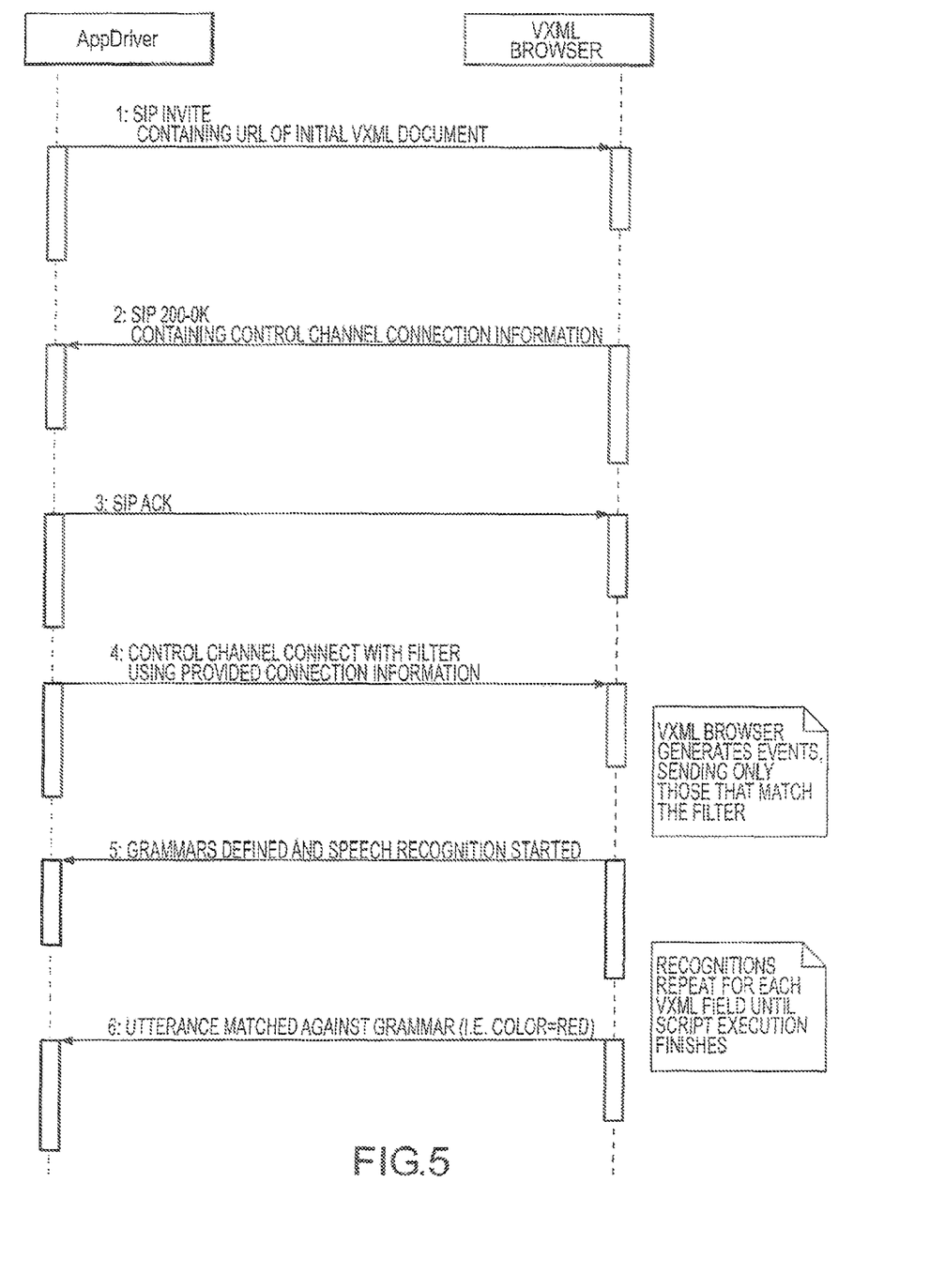
FIG. 5 is a sequencing diagram illustrating an exemplary sequence of an application driver incorporating technology of the present application.

Sequencing diagrams indicative of various operations of system 100 are shown in FIG. 3-5. FIG. 3 shows a sequencing diagram of information associated with a possible multi-modal user interface. FIG. 4 shows a sequencing diagram of information associated with a possible radio gateway or push-to-talk system. FIG. 5 shows a sequencing diagram of information associated with a possible application driver.

Multi-Modal Application

One application of the above system is the programmatic control of web pages by a voice platform. The control can be realized as an overlay to existing web pages, and doesn't require any modification to the web page itself. In particular, the present invention permits a user to follow web pages links and fill in form elements by voice, allows a web page programmer to use the results of speech recognition as events and data in the programmatic control/manipulation of a web page, and does not require modification of the web page source. This functionality is realized by connecting a voice platform (which can provide results of voice commands) to a standard web control such as an applet or toolbar as explained below in association with platform or display 200. While the below description relates to use of an applet, one of ordinary skill in the art would recognize on reading the disclosure any similar tool can be used, such as, for example, using a toolbar. Possible interactions include, but are not limited to, filling in HTML fields, submitting forms, and navigating hyperlinks. It also provides the ability to play audio out to the user.

By way of background, several existing technologies allow voice-enabled manipulation of visual web pages. Two examples are SALT and X+V (XHTML+Voice). All common existing technologies, however, require the page author to alter the markup of their page to add voice capabilities. The present invention, however, provides a mechanism to allow standard HTML pages to be manipulated using voice commands.

This example is taken from the SALT 1.0 specification, it is a markup used to display an HTML text input element, an HTML button, and the SALT tags used to voice-enable the text input element. The highlighted portions show the items that need to be added to plain HTML content to accomplish voice-enablement.

```
<!--HTML-->
<html xmlns:salt="http://www.saltforum.org/2002/SALT">
    <input name="txtBoxCity" type="text"/>
    <input name="buttonCityListen" type="button"
    onClick="listenCity.Start( );" />
    <!--SALT-->
    <salt:listen id="listenCity">
    <salt:grammar name="g_city" src="city.grxml"/>
    <salt:bind targetelement="txtBoxCity"
    value="/city"/>
    </salt:listen>
</html>
```

This SALT sample works well if the web application author is building their application from the ground up with voice capabilities in mind. However, given the enormous number of existing web applications, with millions of existing HTML pages written without voice capabilities in mind, this solution is impractical as each page would need to be re-written to include code similar to the above.

Figure 2:
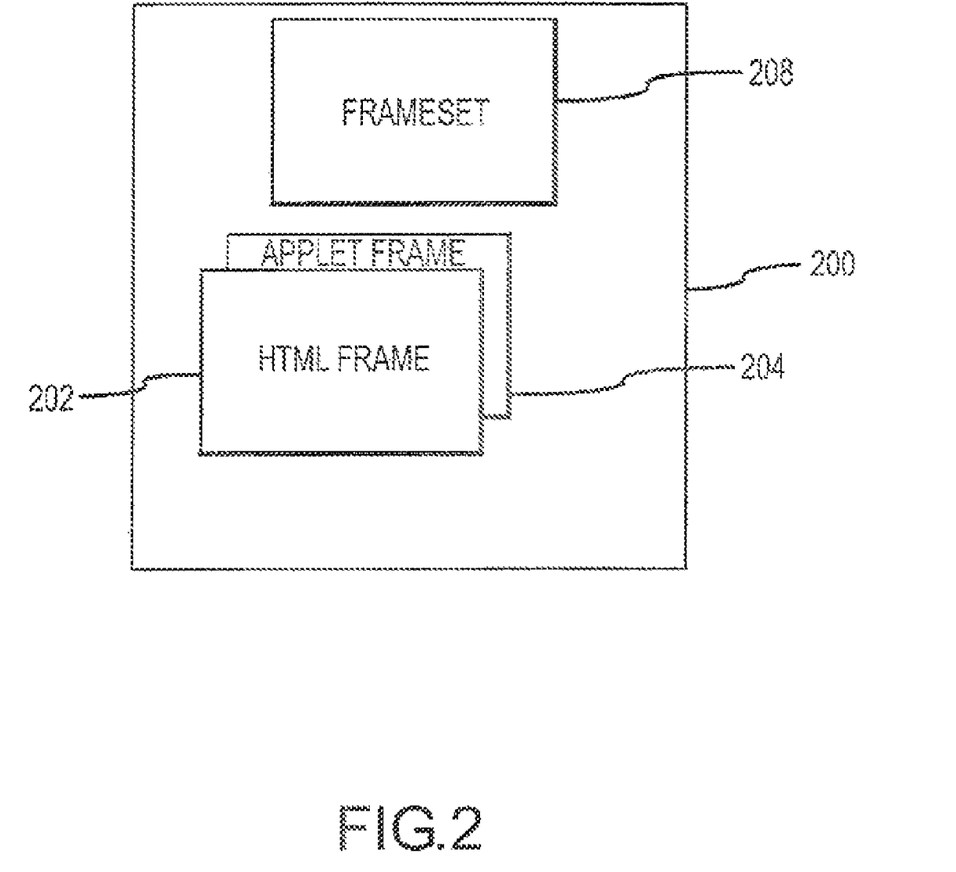
FIG. 2 is a diagram relating to an exemplary display of for a browser incorporating technology of the present application.

It has been discovered however, a different technique to voice enable standard HTML pages is possible using technology associated with the present invention running, for example, ECMAScript, one example of which is JavaScript® from Sun Microsystems, Java® Plug-In technology, the Document Object Model ("DOM") and HTML frames, or other similar tools. These tools are generally referred to as Scripts. In this case, as shown by FIG. 2, the applet runs in one browser frame 204, while a standard HTML page is displayed in another frame 202 on a display 200. The applet can be a visible frame or completely hidden as a matter of design choice. The applet communicates with the HTML page using conventional frame technology, such as, for example, Netscape LiveConnect technology and JavaScript functions that access objects on the page through the DOM. One simple program to accomplish the above requires three HTML pages, although one of ordinary skill in the art will recognize on reading the disclosure a number of different programs can accomplish the same functionality. In this example, the three HTML pages include the original page 202 with the text field and button, an applet page 204 which contains the Multi-Modal Applet, and a frameset page 208, which creates a container for the other two. The applet page and frameset page are diverse and can be used with any HTML page.

Thus, one possible code implementation of the above comprises

```
I.    The Original Page
<!--HTML-->
<html>
    <input name="txtBoxCity" type="text" />
    <input name="buttonCityListen" type="button" onClick="listenCity.Start( );" />
</html>
II.   The Applet
        <html>
            <head>
                <title>Multi-Modal Applet</title>
                <!-- load standard result processing library -->
                <script src="javascript/vxml_result processor.js"> </script>
                    <!-- the following scripting is an example of how to run different
                    VXML pages
                when new pages load within the main content frame. -->
                <script>
                    // called by the main frameset when a new content frame page
                    loads
                    // see index.jsp for details on how this callback is registered
                    function contentFrameOnLoadO( ){
                        mmApplet.runVxml('voice-application.');
                    }
                </script>
                    <!-- the following scripting contains callback functions which
                    handle recognition
                    results generated during user interaction with the VXML
                    application -->
                <script>
                    function handleRecognitionResult(application) {
                        var input = contentFrame.document.all['txtBoxCity'];
                        // convenience reference for the reco interpretation
                        input.value = application.lastresult$.interpretation;
                    } // handleRecognitionResult
                </script>
            </head>
            <body>
                <table>
                    <tr>
                        <td>
                            <applet name="mmApplet"
                                code="com.sandcherry.mmui.sample.applet.MMApplet"
                            </applet>
                        </td>
                    </tr>
                </table>
            </body>
        </html>
III.  The frameset page or index
<html>
    <head>
        <script>
            // This function is called when the content frame loads a new
            // page.
            // It then notifies the applet frame of the event by calling a
            // function
            // within that frame.
            function contentFrameOnLoad( ) {
            // Retrieve a reference to the applet frame
            var appletFrame window.top.frames['AppletFrame'];
            appletFrame.contentFrameOnLoad( );
            }
        </script>
    </head>
    <frameset rows="*,180">
        <frame id="ContentFrame" name="Content Frame" src="original.html"
onload="contentFrameOnLoad( );"/>
        <frame id="AppletFrame" name="Applet Frame" src="applet.jsp"/>
    </frameset>
</html>
```

The highlighted portions in the applet (section II above) display how Script functions can interact with the elements on an HTML page using the DOM. Notice that there is nothing on the HTML page indicating that it is voice enabled, only when the applet frame is loaded and the functions written to tie the two together can the HTML page be voice enabled. Using standard DOM events such as onload, Script functions can be written which instruct the applet to run a voice dialog corresponding to the visual page.

The Multi-Modal Applet acts as a remote proxy for an associated VoiceXML browser. The applet and VoiceXML browser communicate using a network based communication channel 104. When the applet gets a request to run a voice dialog, it relays this request to the VoiceXML browser. The applet requests that the VoiceXML browser load and begin to execute a specific voice dialog, and the VoiceXML browser communicates the success or failure of this operation back to the applet using the control channel. Once a voice dialog is running, audio input is processed according to the voice dialog script and will generate recognition results, and potentially audio output. Audio output is streamed to the applet directly over an RTP audio stream that is set up when the applet connects to the VoiceXML browser. Recognition results are delivered to the applet using the control channel. To be useful in the web browser, the recognition results need to be delivered to the HTML/Script scope in a web page. Using standard LiveConnect technology, a JavaScript function used as a callback function for the applet is invoked with a recognition result. There, logic is written to handle the result in the HTML page.

Push to Talk

The multi-modal applet invention described in the previous section enables a novel and valuable way to drive applications that have web GUIs. The applet allows us to present Push-To-Talk (PTT) control of voice input, which allows precise delineation of the user's utterance. Conventional speech recognition systems are always 'on' and use speech-detection technology (also called "end-pointing") to determine when the user has begun to speak and when he has finished speaking. In particular, some engines wait for 1.5 seconds of silence to decide that the user has stopped speaking, which means that there is a built-in latency (of 1.5 secs) before the engines return a recognition result. In a call center environment, where seconds count, this latency would be a fatal economic impediment to the use of speech recognition by customer service agents. The technology of the present application provides a PTT-like interface to voice commands eliminates the latency and, consequently, can be significantly quicker than the equivalent keyboard & mouse operations. Moreover, the time saving should be economically interesting to call center operators. The key property of "PTT" or "PTT-like" interfaces is a gesture, which indicates that the user has finished speaking and transfers execution to the program. The technology is described with relation to PTT, but is useful for any interface which implements a user gesture that indicates "end of speech," such interfaces are generically referred to as PTT or PTT-like. We note that actual PTT interfaces include a gesture (such as key down) to indicate start-of-speech, but this is not essential to our invention, since current speech-detection technology already reliably identifies the start-of-speech, without material delays to the application. Thus in any contemplated patent submission, the end-of-speech gesture is the crucial one, whether it is realized by via a button (a la 2-way radio), a mouse action, or a (keyboard) key (for desktop PCs).

Figure 8:
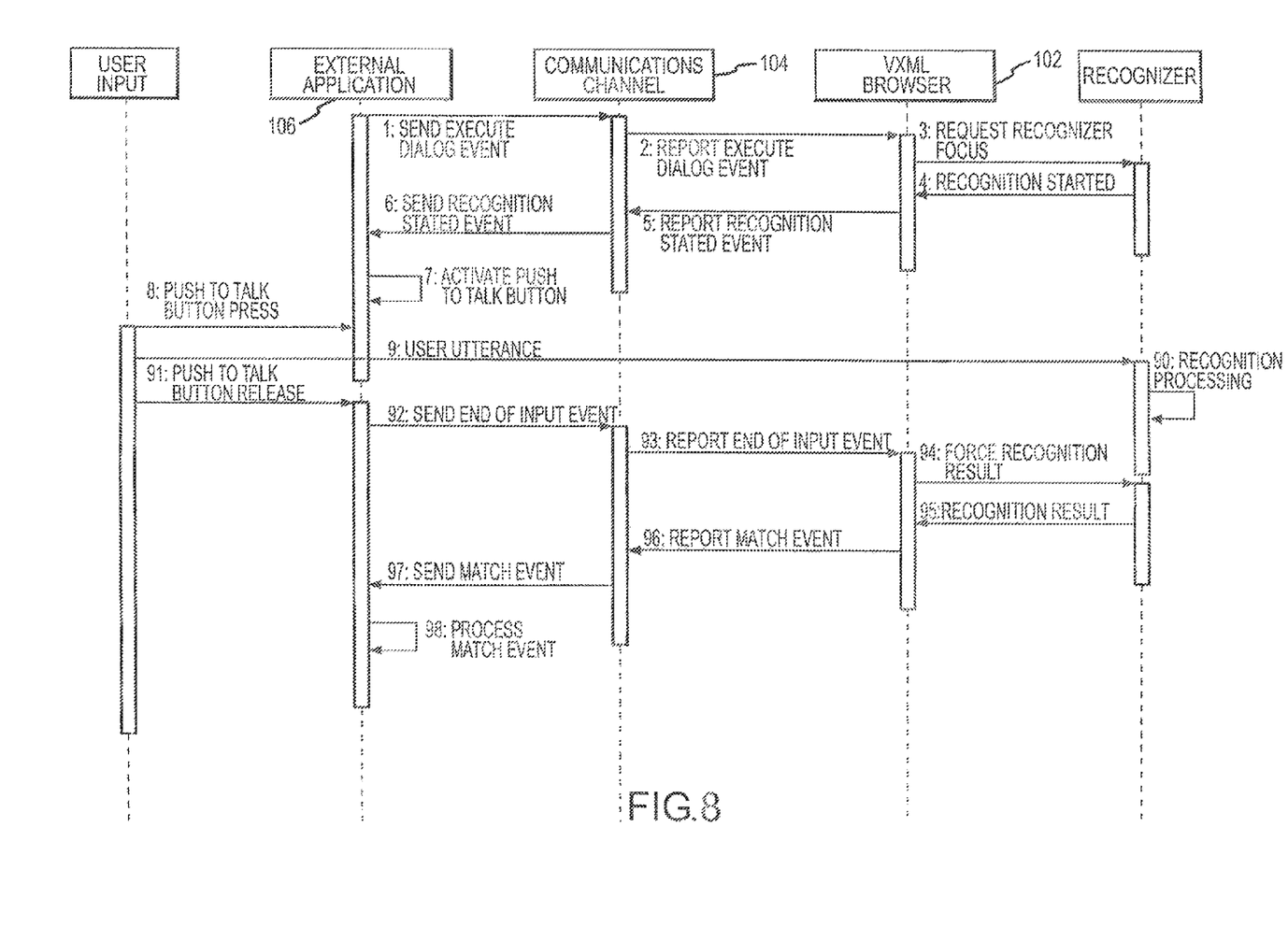
FIG. 8 is a sequencing diagram illustrating an exemplary external command of the system of FIG. 1 using technology of the present application.

Referring now to FIG. 8, a sequencing diagram regarding the above described PTT is provided. First, external application 106 delivers a execute dialog event to communication channel 104, step 81. The execute dialog event is reported to VXML Browser 102, step 82, through control 108 and VXML Interpreter 110 as described above and not re-described herein. VXML Browser 102 requests use of a recognizer, step 83. Once the recognizer is identified for use, the recognition engine is started, step 84. A recognition started event is delivered to communication channel 104, step 85, and transmitted to external application 106, step 86. External application waits for activation of the PTT interface, or other user gesture, step 87. Optionally, external application 106 may provide an indication to the user that the recognition engine is on line and waiting for utterances. The user provides the required gesture, step 88, and speaks (user utterance). The speech is delivered directly to the recognizer identified by VXML browser 102, step 89. The recognizer may recognizer the utterances using any conventional methodology generally known in the art, step 90. Once the user is finished, the PTT interface is released, step 91. External application identifies the release, and delivers the end of speech signal to communication channel 104, step 92. Communication channel transmits the end of speech signal to VXML browser 102 as described above, step 93. VXML browser 102 generates a force recognition result signal to the recognizer, step 94, which delivers a recognition result to VMXL browser 102, step 95. Assuming the recognition result is useable, VXML browser 102 causes a Match event to be published over communication channel 104, step 96, which transmits the match to external application 106, step 97. External application 106 would process the match event (or the actual match signal) in a conventional manner, step 98

Another embodiment of this invention would be a system which includes a PTT microphone inside a TV-remote-control and which connects to speech recognition embedded either in a "set top box" (i.e. cable and satellite TV) for local TV functions or to network based speech recognition for program/service control at the head-end (the cable operator's facility), such as, for example, an enhanced TV-Guide, or a pay-per-view subscription.

While the invention has been particularly shown and described with reference to an embodiment thereof, it will be understood by those skilled in the art that various other changes in the form and details may be made without departing from the spirit and scope of the invention.

What is claimed is:

1. A system for providing external application control of a voice extensible markup language (VXML) browser, comprising:
   a VXML browser to execute a VXML application;
   a VXML Interpreter connected to the VXML browser to parse and store commands to be executed by the VXML browser;
   the VXML browser and VXML Interpreter together executing a form interpretation algorithm that executes prompts and inputs data to the VXML application;
   a control, the control is connected to the VXML Interpreter and the control receives commands for the VXML browser during the execution of the VXML application and transmits the commands to the VXML Interpreter to be executed by the VXML browser; and
   at least one communication channel coupling the control to at least one external application such that during execution of the form interpretation algorithm executing prompts and inputting data to the VXML application the control receives commands transmitted from the at least one external application, where the command is automatically transmitted from the at least one external application based on a preconfigured event, and transmits the command from the at least one external application to the VXML Interpreter that causes the VXML browser to pause the execution of the form interpretation algorithm executing the VXML application and execute the command from the at least one external application such that the external application controls the VXML browser such that the external application inspects a dataset within the VXML application and wherein the VXML browser resumes operation of the form interpretation algorithm subsequent to the execution of the command and the inspection of the dataset from the at least one external application.

2. The system of claim 1, wherein the external applications are selected from a group of applications consisting of: a voice enabled web page, a VXML debugger, a radio gateway, or a test harness.

3. The system of claim 1, wherein the control converts commands from the at least one external application into a format suitable for execution by the VXML browser.

4. The system of claim 1, wherein data is transmitted from the VXML browser to the at least one external application over the at least one communication channel.

5. The system of claim 1, wherein the control converts data being transmitted from the VXML browser into a format suitable for transmission to the at least one communication channel.

6. The system of claim 1, wherein the at least one external application causes transmission of events occurring at the VXML browser to the at least one external application based on at least one filter established by the at least one external application.

7. The system of claim 1, wherein the at least one external application causes the VXML browser to initiate a recognition engine.

8. A system for providing an external application control of a VXML browser executing a VXML application, comprising:
   a VXML, browser to execute a VXML application;
   a VXML Interpreter connected to the VXML browser to parse and store commands for the VXML browser to execute where the VXML browser and VXML Interpreter together execute a form interpretation algorithm that executes prompts and inputs data to the VXML application; and
   means for controlling the VXML browser by the at least one external application, the means for controlling the VXML browser to receive VXML commands from the at least one application, where the command is automatically transmitted from the at least one external application based on a preconfigured event requiring inspection of a dataset within the VXML application, and transmit the received VXML commands to the VXML Interpreter such that the VXML browser pauses execution of the form interpretation algorithm that executes prompts and inputs data to the VXML application, executes the received VXML commands, and resumes execution of the form interpretation algorithm subsequent to the execution of the received VXML commands.

9. The system of claim 8, wherein the means for controlling the VXML browser includes a control to insert commands to the VXML interpreter.

10. The system of claim 9, wherein the control is coupled to at least one communication channel.

11. The system of claim 8, wherein the means for controlling the VXML browser further includes at least one command selected from the group of commands consisting of: filtering, recognizing, and end of speech.

* * * * *